(12) United States Patent
Alperovich et al.

(10) Patent No.: US 7,094,517 B1
(45) Date of Patent: Aug. 22, 2006

(54) RECORDING LAYER WITH ORGANIC DYE-IN-POLYMER (DIP) MEDIUM FOR WRITE-ONCE-READ-MANY (WORM) OPTICAL DISCS WITH FLUORESCENT READING

(75) Inventors: Mark Alperovich, Ashdod (IL); Eugene Levich, New York, NY (US); Irene Zuhl, Ashdod (IL); Svetlana Makievskaya, Ashdod (IL)

(73) Assignee: D Data Inc., New York, NY (US)

( * ) Notice: Subject to any disclaimer, the term of this patent is extended or adjusted under 35 U.S.C. 154(b) by 0 days.

(21) Appl. No.: 09/674,994

(22) PCT Filed: May 13, 1999

(86) PCT No.: PCT/IB99/01266

§ 371 (c)(1), (2), (4) Date: Dec. 13, 2000

(87) PCT Pub. No.: WO99/59142

PCT Pub. Date: Nov. 18, 1999

Related U.S. Application Data

(60) Provisional application No. 60/085,334, filed on May 13, 1998.

(51) Int. Cl.
*G11B 7/24* (2006.01)

(52) U.S. Cl. ............... 430/270.18; 430/270.2; 430/270.21; 430/945; 430/346; 428/64.1; 428/64.8; 369/288

(58) Field of Classification Search ............... 430/945, 430/270.18, 270.2, 270.21; 428/64.1, 64.4, 428/64.8; 369/288, 283
See application file for complete search history.

(56) References Cited

U.S. PATENT DOCUMENTS

| | | | | |
|---|---|---|---|---|
| 4,090,031 A | * | 5/1978 | Russell | 358/130 |
| 4,412,231 A | * | 10/1983 | Namba et al. | 430/945 |
| 4,735,889 A | * | 4/1988 | Namba et al. | 430/270.16 |
| 4,917,989 A | * | 4/1990 | Albert et al. | 430/270.16 |
| 5,156,938 A | * | 10/1992 | Foley et al. | 430/200 |
| 5,185,233 A | | 2/1993 | Santo | 430/945 |
| 5,470,994 A | * | 11/1995 | Saeva et al. | 556/64 |
| 5,506,357 A | | 4/1996 | Namba | 544/225 |
| 5,665,522 A | * | 9/1997 | Vogel et al. | 430/278.1 |
| 6,009,065 A | * | 12/1999 | Glushko et al. | 369/112 |
| 6,071,671 A | * | 6/2000 | Glushko et al. | 430/270.15 |
| 6,277,460 B1 | * | 8/2001 | Min et al. | 430/945 |

FOREIGN PATENT DOCUMENTS

| | | | |
|---|---|---|---|
| EP | 812698 | * | 12/1997 |
| JP | 54-061541 | * | 5/1979 |
| JP | 59-092448 | * | 5/1984 |
| JP | 62-239436 | * | 10/1987 |
| JP | 02-076126 | * | 3/1990 |
| JP | 02-245003 | * | 9/1990 |
| JP | 09-011619 | * | 1/1997 |
| JP | 09-286979 | * | 11/1997 |

OTHER PUBLICATIONS

Crivello et al., "Triaryl Sulfonium as Photoinitiators of Free Radical and Cationic Polymerization", J. Polymer Sci. Letters, vol. 17, pp. 759-764, (1979).*

* cited by examiner

*Primary Examiner*—Martin Angebranndt
(74) *Attorney, Agent, or Firm*—Winston & Strawn LLP

(57) ABSTRACT

High sensitive organic dye-in-polymer (DIP) medium for write-once-read-many (WORM) optical discs with fluorescent reading. The medium consists of a fluorescent color means, capable of absorbing writing radiation produced by a laser, a compound capable of generating free radicals upon influence of heat produced by the writing radiation and a polymer capable of producing a translucent film enabling high quantum yield of the fluorescence induced in the color means. The color means can be selected from xanthene dyes of the eosine and rhodamine groups, acridine, oxazine, azine, peylene, violanthrone, cyanine, phtalocyanine, indigoide colors and porphyries. The free radicals generating compound can be chosen from the group of compounds comprising azo and diazoi compounds or peroxyde compounds. The film producing polymer can be selected from the group of compounds comprising cellulose ethers, vinyl resins or acrylic resins.

19 Claims, No Drawings

US 7,094,517 B1

RECORDING LAYER WITH ORGANIC DYE-IN-POLYMER (DIP) MEDIUM FOR WRITE-ONCE-READ-MANY (WORM) OPTICAL DISCS WITH FLUORESCENT READING

This application claims the benefit of provisional application No. 60/085,334 filed May 13, 1998.

FIELD OF THE INVENTION

This invention is in the field of media for WORM optical discs with fluorescent reading, providing high capacity optical memory, including 3-dimensional optical memory systems.

BACKGROUND OF THE INVENTION

Recently WORM optical memory devices have experienced great evolution, providing recording of data with the possibility of its immediate reading. This feature—data recording in a real-time regime—is significant for various applications of optical recording in memory devices, especially for computer systems. For this field duplication of data is not so essential.

All WORM optical media of practical interest is based on photothermal principle of recording. The data on such media is recorded by scanning the recording layer with the focused laser beam. The laser power is absorbed by the active medium of the layer and transformed into thermal energy, causing its physical and chemical changes, which can be optically registered at reading.

Photochemical effects can also be used, i.e. optically detected changes in the state of medium, caused by direct interaction of photons with this medium. The efforts are made to use photosensitive medium for photochemical recording on WORM discs. Hence, until now there was no practical application for WORM discs with photon mechanism of recording. The reason can be the non-threshold nature of photochemical recording on the contrary to photothermal recording at the same laser for recording and reading (with different laser power). Therefore, the photochemical recording can not provide the necessary stability of medium characteristics at multiple reading.

According to the mechanisms of thermally induced effects, the photothermal recording on WORM optical medium with practical applications can be divided in two parts:
1. Ablative, providing optically registered geometric changes in the thin active layer during its melting, evaporation or chemical transformations, and
2. With phase change, which does not provide geometric changing of the active layer, otherwise changing its optical constants, that causes optical contrast, which is usually not high for these materials.

Among various types of medium for ablative recording, WORM optical discs with thin (10–100 nm) layers of organic dyes with or without dye-in-polymer are of special interest. Layers of organic dyes provide a range of sufficient advantages in comparison to metal or half-metal layers, used in WORM discs with ablative recording. Advantages are the following:
Dyes may have a stronger selective absorption on the recording laser wavelength.
Dye layers are more sensitive to the laser radiation because of their small thermal conductivity and low temperature of melting or decomposition. It provides a higher recording capacity.
Dye layers provide a higher stability at higher humidity.
Medium based on dye layers has better signal-to-noise ratio, because of the lack of noise, provided by amorphous layers.
Coating in the centrifuge makes the layers, that is more simple and cheap than vacuum deposition used for obtaining metal and half-metal layers on WORM discs.

The existing WORM optical discs based on organic dyes has a capacity up to 3.5 GB.

The WORM discs with one recording layer this optical memory capacity is the utmost at least for the diode laser with 780–830 nm wavelength.

Future capacity increase for WORM discs is possible only using three-dimensional optical memory carriers with multilayer data recording and fluorescent reading [A. S. Dvornikov, P. M. Rentzepis, Opt. Comms., v.136, pp. 1–6 (1997); B. Glushko, U.S. Provisional Patent Application, May 8, 1997, N 25457.].

Fluorescent reading offers a range of sufficient advantages in comparison to reading, based on changing the reflection ratio, even in single-layer systems.

One of the advantages is the reduced tolerance for the sizes of recorded pits in comparison to the existing WORM discs. I.e., changing the size on a 100 nm does not influence the reading from fluorescent disc, while it totally eliminates the signal from reflective discs.

Another advantage is the reduced sensitivity of fluorescent discs to changing the slope up to 1 grad that is absolutely intolerable for reflective discs.

Nevertheless, the basic advantage of fluorescent reading is the enhanced capacity of three-dimensional optical memory carriers, realized as multilayer discs.

Use of layers of organic dyes with ablative recording in such medium is not possible owing to the following reasons:
Reading is realized by laser beam, scanning the change of reflection in the pre-irradiated spots. In a multilayer system, this method causes a strong fall of reading quality, becoming dramatic for systems with over four active layers.
Heat change of the layer geometrical structure at recording, such as: burning out of holes, creation of bubbles, change of surface texture, etc. It is also unsuitable for multilayer medium, as it causes dispersion of the reading beam, hence abruptly lowering the level of fluorescent signal.
The dye concentration in the recording layer of the existing WORM discs is the utmost (up to 99%). In this case, the dye fluorescence is usually suppressed because of high concentration.

In the thin dye layers (10–100 nm) of the existing WORM discs the local heating of the medium at recording can reach 700° C. Such high temperature make it difficult to avoid changing the geometrical structure of the layer. Increase of the dye layer thickness up to 200 nm and more using polymer dye at preserving the surface concentration of dye leads to lowering the local heating temperature and allows to prevent the layer deformation. It also provides the appearance and growth of the dye fluorescence due to lowering the concentration suppression effect. However at all the same conditions the layer sensitivity to laser radiation is dramatically lowering, that leads to drop of recording speed and density.

Thus, all the known materials, used for single-layer optical WORM discs with reflective reading, as well as photothermal recording methods can not be used for multilayer optical WORM discs with fluorescent reading. Comparatively thick layers (200 nm and more) of fluorescent dye are likely not suitable for multilayer medium as well without use of special additives and ways of recording, increasing recording speed and density.

SUMMARY OF THE INVENTION

Considering the above-stated, the purpose of this Invention is the obtaining of a high-sensitive organic dye-in-polymer (DIP) medium for write-once-read-many (WORM) optical discs with fluorescent reading, providing high speed and density of photothermal recording.

The other purpose of the present Invention is the obtaining of a DIP environment with high sensitivity to the recording laser radiation in visual and infra-red range.

The future purpose of the present Invention is the obtaining of a DIP environment for single- and multilayer mediums with high optical memory capacity and high signal-to-noise ratio.

According to the purpose of the present Invention, the above-stated DIP environment contains a fluorescent dye, capable to absorb the recording laser radiation and to transform the absorbed light power into heat, and a choice of substances, capable to generate free radicals at their decomposition under heating, received from the laser radiation absorption by the fluorescent dye.

According to the other purpose of the present Invention, the above-stated DIP environment contains a fluorescent dye and a non-fluorescent dye, capable to absorb the recording laser radiation and to transform the absorbed light power into heat, and a choice of substances, capable to generate free radicals at their decomposition under heating, received from the laser radiation absorption by the non-fluorescent dye.

According to the future purpose of the present Invention, the above-mentioned free radicals cause the discoloring or change of absorption spectrum range of the fluorescent and/or non-fluorescent dyes, thus making the recording.

If the discoloring or change of color of the fluorescent and/or non-fluorescent dyes makes the recording, absorption and fluorescence spectrum ranges of the first dye can just slightly overlap the absorption spectrum of the second dye. In this case, the layer is fluorescent before recording. After recording is made, the irradiated spots lose fluorescence, while the background remains fluorescent.

If the discoloring or change of color of only the non-fluorescent dye makes the recording, than its absorption spectrum range shall overlap the absorption and/or fluorescence spectrum of the fluorescent dye. In this case, the layer is not fluorescent before recording. After recording is made, the irradiated spots become fluorescent, while the background is not fluorescent.

DETAILED DESCRIPTION OF THE PREFERRED EMBODIMENTS

Below there is a detailed description of the mostly preferred ways to reach the intended purposes of the Invention.

First we shall consider the variant when the substrate—a transparent disc from glass, polymethylmethacrylate, polycarbonate or polyethylene terephthalate—is covered with a recording layer, consisting of at least a fluorescent dye, capable to absorb the recording laser radiation, a compound, capable to generate free radicals during decomposition under heating, received from the laser radiation absorption by the fluorescent dye, and a film-forming polymer with high transparency, low heat conductivity and capable to provide the necessary quantum output of the dye fluorescence.

Besides, the recording layer can contain compounds, quickening or suppressing photothermal decoloration of the dye, plastifiers, surface-active substances, organic reducers, preventing free radicals oxygen deactivation, etc.

The thickness of recording layer can be 100–1000 nm, preferably—200–500 nm. Fluorescent dye with absorption maximum near the recording laser wavelength is chosen among the xanthene dyes of the eosin and rhodamine groups, acridine, Oxazine, azine, perylene, violanthrone, cyanine, phthelocyanine dyes, indigoide colors and porphyries.

The content of fluorescent dye in the layer is equal to 0.1–10%.

The choice of compound, capable to generate free radicals during decomposition under heating, received from the laser radiation absorption by the fluorescent dye, shall consider the relevant temperatures and rate of its decomposition. The possible compounds, capable to generate free radicals, are azo and diazo compounds such as azo-bisisobutyronitrile, p-bromobenzene diazohydroxide, triphenylmethylazibenzene and diazobenzoyl, nitrosoacetanilide and its derivatives; peroxides such as benzyl peroxide and its derivatives, tert-dibutyl peroxide, etc.

The content of compound, capable to generate free radicals, in the recording layer 10 is equal to 0.1–20%.

The free radicals, appearing during thermal decomposition of the above-mentioned compounds, are extremely reactive towards organic substances. One of the typical reactions with free radicals is their chain bonding to olefin bond.

This reaction is one of the main reasons for decoloration of organic dyes. The free radicals interact with olefin linkages of the dye, making the dye molecules decay, what leads to decoloration or change of color.

The film-forming polymer can be selected from a wide range of resins, such as: cellulose esters, i.e. nitrocellulose, cellulose acetate, cellulose acetate butyrate; cellulose ethers, i.e. methyl cellulose, ethyl cellulose, butyl cellulose; vinyl resins, i.e. polyvinyl acetate, polyvinyl butyral, polyvinyl acetyl, polyvinyl alcohol and polyvinyl pyrrolidon; acrylic resins, i.e. polymethylmetacrylate, polybutyl acrylate, polymethacylic acid, polyacryl amid polyacrylonitrile.

Film-forming properties of the used resins and the plasticity of the recording layer can be improved by adding to resins the proper plastifier, such as dibutyl phthalate, dioctyl phthalate or tricresyl phosphate.

Zinc, lead, or cadmium salts of the higher aliphatic acids and also urea and etanolamine can be used for lowering decomposition temperature of compounds, generating free radicals, and therefore quickening the decoloring process.

Hydroquinone, aliphatic and heterocyclic amines, sulfur containing compounds such as thiols, sulfides, disulfides isothiocyanates can be used to slow down decomposition of the compounds, generating free radicals.

Reducing amines can also be added to prevent free radicals oxygen deactivation. They can be n-butylamine, dimethylaminoethyl methacrylate, diethyl-n-butylphosphine, and isoamyl 4-dimethylaminobensoate.

To create a recording layer of the present Invention, the above-mentioned ingredients are dissolved in organic solvent or introduced in it as microcapsules less than 0.2 micron in size, prepared by known methods, with future covering the substrate with this compound by spin coating, roller coating or dip coating.

The organic solvent is usually selected from alcohols, ketones, amides, sulfoxides, ethers, esters, halogenated aliphatic hydrocarbons or aromatic solvents. Examples of such solvents include methanol, ethanol, iso-propanol, iso-butanol, tetrafluoro-ethanol, diacetone alcohol, methyl cellosolve, ethyl cellosolve, acetone, methylethylketone, cyclohexanone, N,N-dimethhyl-formamide, N,N-dimethylacetamide, dimethylsulfoxide, tetra-hydrofurane, dioxane, ethyl acetate, chloroform, methylene chloride, dichloroethane, toluene, xylene or their mixtures.

In the other variant of realizing purposes of this Invention the recording layer also contains a non-fluorescent dye with an absorption spectrum range just slightly overlapping the absorption and fluorescence spectrum range of the fluorescent dye and with the maximum absorption value being close to the recording laser wavelength. The layer is fluorescent in its initial state before recording. During recording the non-fluorescent dye absorbs the laser radiation and transforms the absorbed light power into heat, influencing the generation of free radicals, causing decoloration of the fluorescent dye.

(The non-fluorescent dye can also lose color, what does not effect the use features of the medium.) After recording the irradiated spots has no fluorescence, while the background remains fluorescent. The advantage of this variant in comparison to the previous one is that the non-fluorescent dye is more effective in transforming light power to heat, than the fluorescent one, hence in this case we are to use lasers with different wavelength for recording and reading.

In the other variant of realizing purposes of this Invention the recording layer also contains a non-fluorescent dye with an absorption spectrum range covering the absorption and/or fluorescence spectrum range of the fluorescent dye. Concentration of the fluorescent dye shall provide a non-fluorescent layer before recording. Absence of fluorescence in the case, when absorption spectrum range of the non-fluorescent dye overlaps the absorption spectrum range of the fluorescent dye is caused by the fact that absorption optical density of the $1^{st}$ dye is much higher than the $2^{nd}$ one.

If the non-fluorescent dye absorption spectrum overlaps with the fluorescent dye absorption spectrum, absence of fluorescence is provided by non-radiating intermolecular electronic excitation energy transfer from the second dye D* to the first A upon the Firster's resonance mechanism. This energy transfer process is schematically described by the following equations:

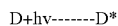

where the * means the electronically excited state.

At recording, the fluorescent and non-fluorescent dyes absorb laser radiation and transform the absorbed light power into heat, which influences the generation of free radicals, causing decoloration of the non-fluorescent dye. After recording, the irradiated spots become fluorescent. It allows to use the same laser (but with different pulse power) for recording and reading.

In the present Invention the single recording layer of the optical disc is either directly deposited on the substrate, or there is also an intermediate layer between the substrate and the recording layer, that improves adhesion and mechanical solidity and lowers heat losses, preventing heat distribution into the substrate. Besides, use of intermediate layer can allow adding into the recording layer the solvents, being aggressive to the substrate.

Besides, the recording layer can consist of two polymer sub-layers, one containing dyes, and the other containing the compound, generating free radicals, with the latter positioned above or below the sub-layer with dyes.

The recording layer can be covered with a protective layer or another substrate can be bonded on it to protect the recording layer against the external environment and to improve its safety.

For obtaining a multilayer disc for three-dimensional optical memory with fluorescent reading the present Invention proposes consecutive bonding of the described above single-layer discs one to another so that the active recording layers would alternate the inactive separating layers of substrate.

For obtaining a multilayer disc the glues shall be used, providing good adhesion of the bonded surfaces and absence of contraction, not influencing negatively the properties of recording layers, not lowering signal-to-noise ratio, transparent for the laser wavelength and fluorescent light. Examples of such glues include UV-hardened optical glues of 3-92, UV-71, UV-69, UV-74, J-91, VTC-2, SK-9 types (<<Catalog of Summers laboratories>>).

Consecutive scanning of every recording layer by a focused laser beam makes the data recording on a multilayer disc. The same way the reading is made.

EXAMPLE 1

To obtain the recording layer medium we prepared the methylene chloride solution, containing as film-forming resin—1% polymethylmethacrylate (PMMA), as fluorescent dye—0.013% Oxazine 625 Perchlorate with λmax. abc.=645 nm and λmax. fluor.=680 nm (Exciton, Inc.) and as a compound generating free radicals—0.03% benzyl peroxide. The compound solvent was filtered, deposited on a glass disc and dried to form a recording layer with 500 nm thickness.

EXAMPLE 2

To obtain the recording layer medium we prepared the methylene chloride solution, containing as film-forming resin—1% polymethylmethacrylate (PMMA), as fluorescent dye—0.01% HIDC Iodide with λmax. abc.=641 nm and λmax. fluor.=680 nm (Exciton, Inc.) and as a compound generating free radicals—0.03% benzyl peroxide. The compound solvent was filtered, deposited on a glass disc and dried to form a recording layer with 500 nm thickness.

EXAMPLE 3

To obtain the recording layer medium we prepared the methylene chloride solution, containing 1% polymethylmethacrylate (PMMA), as fluorescent dye—0.009% HITC Iodide with λmax. abc.=751 nm and λmax. fluor.=790 nm (Exciton, Inc.) and as a compound generating free radicals—0.002% benzyl peroxide. The compound solvent was filtered, deposited on a glass disc and dried to form a recording layer with 500 nm thickness.

EXAMPLE 4

To obtain the recording layer medium the polyvinylacetate (1%), Oxazine 725 Perchlorate (0.013%), plasticizer—dioctyl phthalate (0.2%) and benzyl peroxide (0.03%) were dissolved in a mixture of ethanol, ethyl cellosolve, iso-propanol, and iso-butanol (4:2:1:1). The compound solvent was filtered, deposited on a glass disc and dried to form a recording layer with 500 nm thickness.

EXAMPLE 5

To obtain the recording layer medium the polyvinylacetate (1%), HIDC Iodide (Exciton, Inc.) (0.01%), dioctyl phthalate (0.2%) and benzyl peroxide (0.003%) were dissolved in a mixture of ethanol, ethyl cellosolve, iso-propanol, and iso-butanol (4:2:1:1). The compound solvent was filtered, deposited on a glass disc and dried to form a recording layer with 500 nm thickness.

EXAMPLE 6

To obtain the recording layer medium the polyvinylacetate (1%), HITC Iodide (Exciton, Inc.) (0.009%), dioctyl phthalate (0.2%) and benzyl peroxide (0.002%) were dissolved in a mixture of ethanol, ethyl cellosolve, iso-propanol, and iso-butanol (4:2:1:1). The compound solvent was filtered, deposited on a glass disc and dried to form a recording layer with 500 nm thickness.

EXAMPLE 7

The same as in examples 1–6, only benzyl peroxide was not dissolved in the compound for the recording layer, but was introduce in it as microcapsules with average diameter 0.1 micron.

EXAMPLE 8

The same as in examples 1,2,4,5, only the recording layer had two sub-layers. The lower sub-layer of 250 nm thickness contained fluorescent dye, while the upper sub-layer of 250 mm thickness contained benzyl peroxide—as the substance generating free radicals at high temperature. All the other mentioned additives were equally distributed in the two sub-layers.

EXAMPLE 9

The same as in examples 1,2,4,5, only the recording layer had two sub-layers. The lower sub-layer of 250 nm thickness contained benzyl peroxide—as the substance generating free radicals at high temperature, while the upper sub-layer of 250 nm thickness contained fluorescent dye. All the other mentioned additives were equally distributed in the two sub-layers.

EXAMPLE 10

The same as in examples 8 and 9, only the sub-layer containing the substance generating free radicals at high temperature, also contained a non-fluorescent dye—Tetraphenyl nickel dithiolene ($\lambda$max. abs.=860 mm). In this case, a diode laser with the 830 mm wavelength made the recording, the reading being made at 650 nm laser wavelength.

EXAMPLE 11

The same as in examples 1,2,4,5,7–9, only the recording layers and the sub-layers, containing fluorescent dyes with the maximum absorption near the laser wavelength 650 nm, also contains the dye—1,1',3,3,3',3'-hexamethyl-4,5,4'5'-dibenzo-indodicarbocyanine iodide with $\lambda$max. Abc.=685 mm. In this case recording and reading were made with one laser with 650 nm wavelength.

EXAMPLE 12

The same as in examples 1–11, only the recording layers and the sub-layers contained azo-bisisobutyronitrile instead of benzyl peroxide.

EXAMPLE 13

For obtaining a multilayer WORM disc 10 single-layer discs, obtained according to one of the examples 1–12, were bonded one after another so that the active recording layers would alternate the inactive separating layers of substrate, using UV-69 glue. The glue was UV-hardened.

Every optical disc obtained according to examples 1–13 was placed on the rotating table, rotated with the speed of 1800 rpm, and recorded by focused pulses of 1 MHz frequency, received from a semiconductor laser with 830 or 650 nm wavelength. The recording power was 30–60 mJ/cm$^2$. For comparison, we took a standard CD-R disc by TDK with ablative recording and reflective reading. An optical microscope was use to follow physical and chemical changes of the layer after recording.

This discovered decoloration of the dye on the studied examples on the irradiated spots. As a result, on the examples 1–10 and relevant examples 12 and 13 the recorded spots were not fluorescent, while the background remained fluorescent. On the example 11 and relevant examples 12 and 13, the recorded spots were fluorescent, while the background was not. The observation showed no change in the geometrical structure of the recording layer. Under the same conditions, the standard CD-R disc was ablatively recorded by thermoperforation. The signal-to-noise ratio on the studied examples was higher than on the CD-R disc and equal to 4–6.

Thus, the trials under study of the obtained examples have shown their enough sensitivity to the recording laser radiation of visible and infra-red range, high speed and density of photothermal recording and their suitability for data recording and fluorescent reading on the existing drivers with some small construction changes.

What is claimed is:

1. A recording layer for write-once-read-many (WORM) optical disks with fluorescent reading, comprising:
    a fluorescent dye capable of absorbing recording laser radiation, present in an amount of about 0.1 weight percent to 10 weight percent of the recording layer;
    a non-fluorescent dye capable of absorbing recording laser radiation and transforming the absorbed radiation to heat;
    a compound that generates free radicals to decolorize the fluorescent dye, non-fluorescent dye, or both as a result of decomposition under heating induced by laser-radiation absorption by the fluorescent dye; and
    a film-forming polymer,
    wherein the compound that generates free radicals is selected from the group consisting of azo-bisisobutyronitrile, p-bromobenzene diazohydroxide, triphenyl-methylazobenzene, diazobenzoyl, nitrosoacetanilide, peroxides, and a mixture thereof, and the recording layer is 100 nm to 1000 nm in thickness.

2. The recording layer according to claim 1, wherein said fluorescent dye is chosen from one or more of xanthene dyes of the eosin and rhodamine groups, acridine, oxazine, azine, perylene, violanthrone, cyanine, phthalocyanine dyes, indigoid colorants and porphyrins.

3. The recording layer according to claim 1, wherein said film-forming polymer is chosen from the group of resins consisting of cellulose esters, cellulose ethers, acrylic resins, vinyl resins, and a mixture thereof.

4. The recording layer according to claim 3, wherein the cellulose esters are selected from the group consisting of nitrocellulose, cellulose acetate, cellulose acetate butyrate, and a combination thereof.

5. The recording layer according to claim 3, wherein the cellulose ethers are selected from the group consisting of methyl cellulose, ethyl cellulose, butyl cellulose, and a combination thereof, and the vinyl resins are selected from the group consisting of polyvinyl acetate, polyvinyl butyral, polyvinyl acetyl, polyvinyl alcohol, polyvinyl pyrrolidone, and a combination thereof.

6. The recording layer according to claim 3, wherein the acrylic resins are selected from the group consisting of polymethylmethacrylate, polybutyl acrylate, polymethacrylic acid, polyacryl amide, polyacrylonitrile, and a combination thereof.

7. The recording layer according to claim 1, wherein the non-fluorescent dye has an absorption spectrum range overlapping with the absorption and fluorescence spectrum ranges of the fluorescent dye and with the maximum absorption or fluorescence spectrum range of the fluorescent dye.

8. The recording layer according to claim 1, wherein the non-fluorescent dye has an absorption spectrum range overlapping the absorption and fluorescence spectrum range of the fluorescent dye.

9. The recording layer according to claim 1, wherein the content of said compound that generates free radicals, in the recording layer ranges from about 0.1 percent to 20 percent.

10. The recording layer according to claim 1, wherein the peroxides are selected from the group consisting of benzyl peroxide and tert-dibutyl peroxide, and a combination thereof.

11. The recording layer according to claim 1, wherein the recording layer is 200 nm to less than 500 nm in thickness.

12. The recording layer according to claim 1, further comprising a compound that can be used to lower the decomposition temperature of the compound that generates free radicals.

13. The recording layer according to claim 12, wherein the compound that lowers the decomposition temperature comprises a zinc, lead, or cadmium salt of an aliphatic acid; urea; or ethanolamine, or a combination thereof.

14. The recording layer according to claim 12, further comprising a compound that prevents free radical oxygen deactivation.

15. The recording layer according to claim 14, wherein the compound comprises one or more of n-butylamine, dimethylaminoethyl methacrylate, diethyl-n-butylphosphine, or isoamyl 4-dimethylaminobenzoate.

16. A method of obtaining a single-layer optical WORM disc, which comprises:

dissolving a fluorescent dye capable of absorbing recording laser radiation; a compound that generates free radicals to decolorize the fluorescent dye as a result of decomposition under heating induced by laser-radiation absorption by the fluorescent dye; and a film-forming polymer, in an organic solvent chosen from the group consisting of alcohols, ketones, amides, sulfoxides, ethers, esters, halogenated aliphatic hydrocarbons and aromatic solvents to form a composition, or introducing the dye, compound and polymer into the solvent as microcapsules less than 0.2 micron in size to form a composition; and covering said composition by spin coating, roller coating or dip coating on a substrate selected from the group consisting of glass, polymethylmethacrylate, polycarbonate, and polyethylene terephthalate disc, wherein the dye is present in an amount of about 0.1 weight percent to 10 weight percent of a recording layer and the compound that generates free radicals is selected from the group consisting of azo-bisisobutyronitrile, p-bromobenzene diazohydroxide, triphenylmethylazobenzene, diazobenzoyl, nitrosoacetanilide, peroxides, and a mixture thereof.

17. A method of obtaining a multilayer WORM disc by consecutive bonding of single-layer discs obtained according to claim 16, one to another, to form a multilayer system with two or more recording layers, in which the recording layers alternate with separating layers of substrate.

18. A method of obtaining a single-layer optical WORM disc, comprising creation of a recording layer from two sub-layers, a lower sub-layer comprising fluorescent dye present in an amount of about 0.1 weight percent to 10 weight percent of the recording layer, and an upper sub-layer comprising a non-fluorescent dye capable of absorbing recording laser radiation and transforming the absorbed radiation to heat and a substance generating free radicals to decolorize the fluorescent dye, non-fluorescent dye, or both at high temperature.

19. A method of obtaining a single-layer optical WORM disc, comprising creation of a recording layer from two sub-layers, an upper sub-layer comprising fluorescent dye present in an amount of about 0.1 weight percent to 10 weight percent of the recording layer, and a lower sub-layer comprising a non-fluorescent dye capable of absorbing recording laser radiation and transforming the absorbed radiation to heat and a substance generating free radicals to decolorize the fluorescent dye, non-fluorescent dye, or both at high temperature.

* * * * *